US011308602B2

(12) United States Patent
Chen et al.

(10) Patent No.: US 11,308,602 B2
(45) Date of Patent: Apr. 19, 2022

(54) CASCADE DEFECT INSPECTION

(71) Applicant: ASML Netherlands B.V., AH Veldhoven (NL)

(72) Inventors: Zhichao Chen, San Jose, CA (US); Wei Fang, Milpitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 204 days.

(21) Appl. No.: 16/479,203

(22) PCT Filed: Jan. 18, 2018

(86) PCT No.: PCT/EP2018/051164
§ 371 (c)(1),
(2) Date: Jul. 18, 2019

(87) PCT Pub. No.: WO2018/134287
PCT Pub. Date: Jul. 26, 2018

(65) Prior Publication Data
US 2019/0347784 A1    Nov. 14, 2019

Related U.S. Application Data

(60) Provisional application No. 62/617,136, filed on Jan. 12, 2018, provisional application No. 62/447,576, filed on Jan. 18, 2017.

(51) Int. Cl.
*G06T 7/00* (2017.01)
*G01N 21/95* (2006.01)

(52) U.S. Cl.
CPC ....... *G06T 7/0004* (2013.01); *G01N 21/9501* (2013.01); *G06T 2207/30148* (2013.01)

(58) Field of Classification Search
None
See application file for complete search history.

(56) References Cited

U.S. PATENT DOCUMENTS 4,999,785 A * 3/1991 Schmuter ............. G06T 7/0004
382/150
6,566,671 B1 * 5/2003 Yoshida ........... G01N 21/95607
250/208.1

(Continued)

FOREIGN PATENT DOCUMENTS

CN    103185730 A    7/2013
TW    201546927     12/2015

OTHER PUBLICATIONS

Office Action issued in related International Application No. 10710911, from the Taiwanese Intellectual Property Office, dated Mar. 27, 2019, Chinese-language and English-language translation included (17 pgs.).

*Primary Examiner* — Nancy Bitar
(74) *Attorney, Agent, or Firm* — Finnegan, Henderson, Farabow, Garrett & Dunner, LLP

(57) ABSTRACT

A defect inspection system is disclosed. According to certain embodiments, the system includes a memory storing instructions implemented as a plurality of modules. Each of the plurality of modules is configured to detect defects having a different property. The system also includes a controller configured to cause the computer system to: receive inspection data representing an image of a wafer; input the inspection data to a first module of the plurality of modules, the first module outputs a first set of points of interests (POIs) having a first property; input the first set of POIs to a second module of the plurality of modules, the second module output a second set of POIs having the second property; and report that the second set of POIs as defects having both the first property and the second property.

15 Claims, 10 Drawing Sheets

(56) References Cited

U.S. PATENT DOCUMENTS

| | | | |
|---|---|---|---|
| 8,410,460 B2* | 4/2013 | Yoshida | G01N 21/956 250/504 R |
| 8,908,957 B2* | 12/2014 | Leu | G01N 21/9501 382/144 |
| 2011/0032348 A1* | 2/2011 | Lim | G06T 7/0006 348/87 |
| 2015/0022654 A1 | 1/2015 | Greenberg et al. | |

* cited by examiner

CASCADE DEFECT INSPECTION

CROSS-REFERENCE TO RELATED APPLICATIONS

This application is a national stage filing under 35 U.S.C. § 371 of International Application No. PCT/EP2018/051164, filed on Jan. 18, 2018, and published as WO 2018/134287 A1, which is based upon and claims priority to U.S. Provisional Application No. 62/447,576, filed Jan. 18, 2017, and entitled "Cascade Defect Inspection," and to U.S. Provisional Application No. 62/617,136, filed Jan. 12, 2018, and entitled "Cascade Defect Inspection," and these applications are incorporated herein by reference in their entireties.

TECHNICAL FIELD

The present disclosure generally relates to the field of detecting defects of a wafer, and more particularly, to a system and method for performing cascade defect inspection.

BACKGROUND

In manufacturing processes of integrated circuits (ICs), unfinished or finished circuit components need to be inspected to ensure that they are manufactured according to design and are free of defects. As such, a defect inspection process has been integrated into the manufacturing process. Specifically, a defect inspection system may employ optical microscopies or a charged particle (e.g., electron) beam microscopes, such as a scanning electron microscope (SEM), to scan a wafer and construct an image of the wafer surface. The defect inspection system may then examine the image to detect defects and determine their position coordinates on the wafer.

The defects may have different types (e.g., bridge between lines, broken line, closed or deformed contact, missing or extra pattern, etc.) and sizes (e.g., critical-dimension error). In the present disclosure, defect types and defect sizes are generally referred to as "defect properties." During conventional inspection processes, defects of different properties are detected separately. That is, the same part of the wafer image has to be examined repeatedly in order to detect defects of different properties.

However, this approach has several limitations. In particular, a defect may have more than one property. For example, a defect may be a broken line that also has a wrong width. Both of these properties are important to know for manufacturing purpose. But the conventional approach does not show the correlations of the two properties. Moreover, because different defect properties have to be checked separately and repeatedly, it is difficult to lower the nuisance rate or improve the throughput.

SUMMARY

Embodiments of the present disclosure relate to a system for inspecting defects of a wafer. In some embodiments, a computer system is provided. The computer system includes a memory storing instructions implemented as a plurality of modules. Each of the plurality of modules is configured to detect defects having a different property. The computer system also includes a controller configured to cause the computer system to: receive inspection data representing an image of a wafer; input the inspection data to a first module of the plurality of modules, the first module outputs a first set of points of interests (POIs) having a first property; input the first set of POIs to a second module of the plurality of modules, the second module outputs a second set of POIs having a second property; and report the second set of POIs as defects having both the first property and the second property.

In some embodiments, a computer system is provided. The computer system includes a memory storing instructions. The computer system also includes a processor coupled to the memory. The processor is configured to execute the instructions to cause the computer system to: receive inspection data representing an image of a wafer; determine, in the inspection image, a first set of points of interests (POIs) having a first property; determine, in the first set of POIs, a second set of POIs having a second property; and report the second set of POIs as defects having both the first property and the second property.

In some embodiments, a defect inspection system is provided. The system includes an inspection tool for inspecting a wafer. The system also includes a memory storing instructions implemented as a plurality of modules. Each of the plurality of modules is configured to detect defects with a different property. The system further includes a controller electronically coupled to the inspection tool and memory. The controller is configured to cause the defect inspection system to: receive, from the inspection tool, inspection data representing an image of the wafer; input the inspection data to a first module of the plurality of modules, the first module outputs a first set of points of interests (POIs) having a first property; input the first set of POIs to a second module of the plurality of modules, the second module outputs a second set of POIs having s second property; and report the second set of POIs as defects having both the first property and the second property.

In some embodiments, a defect inspection system is provided. The system includes an inspection tool for inspecting a wafer. The system also includes a memory storing instructions. The system further includes a processor electronically coupled to the memory and the inspection tool. The processor is configured to execute the instructions to cause the defect inspection system to: receive, from the inspection tool, inspection data representing an image of the wafer; determine, in the inspection image, a first set of points of interests (POIs) having a first property; determine, in the first set of POIs, a second set of POIs having a second property; and report the second set of POIs as defects having both the first property and the second property.

In some embodiments, a method is provided. The method includes receiving inspection data representing an image of a wafer. The method also includes inputting the inspection data to a first module of a plurality of modules. Each of the plurality of modules is configured to detect defects with a different property. The first module outputs a first set of points of interests (POIs) having a first property. The method also includes inputting the first set of POIs to the second module of the plurality of modules. The second module outputs a second set of POIs having a second property. The method further includes reporting the second set of POIs as defects having both the first property and the second property.

In some embodiments, a method is provided. The method includes receiving inspection data representing an image of a wafer. The method also includes determining, in the inspection image, a first set of points of interests (POIs) having a first property. The method also includes determining, in the first set of POIs, a second set of POIs having a second property. The method further includes reporting the second set of POIs as defects having both the first property and the second property.

In some embodiments, a non-transitory computer-readable medium is provided. The medium stores instructions that, when executed by one or more processors, cause the processors to perform a method including: inputting the inspection data to a first module of a plurality of modules, each of the plurality of modules being configured to detect defects with a different property, the first module outputting a first set of points of interests (POIs) having the first property; inputting the first set of POIs to a second module of the plurality of modules, the second module outputting a second set of POIs having a second property; and reporting the second set of POIs as defects having both the first property and the second property.

In some embodiments, a non-transitory computer-readable medium is provided. The medium stores instructions that, when executed by one or more processors, cause the processors to perform a method including: receiving inspection data representing an image of a wafer; determining, in the inspection image, a first set of points of interests (POIs) having a first property; determining, in the first set of POIs, a second set of POIs having a second property; and reporting the second set of POIs as defects having both the first property and the second property.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present application discloses a system and method for performing cascade inspection of defects. In particular, the disclosed system may employ different software modules to detect defects with different properties. When it is desirable to detect defects with multiple properties, the system may use the point-of-interest (POI) output of a first module as input for a second module. As used in the present disclosure, "POI" refers to a region or sub-region on a surface of a wafer that may contain a defect of certain property. In this way, the second module only inspects the POIs in which the first module reports defects. Therefore, the efficiency and accuracy of defect inspection can be improved.

Figure 1:
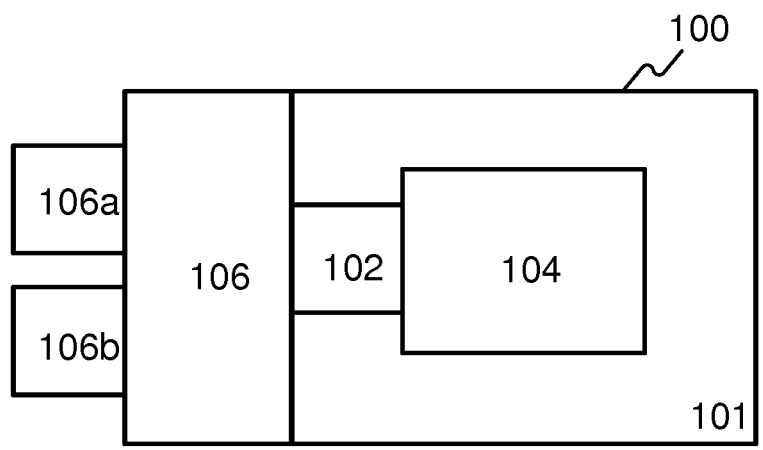
FIG. 1 is a schematic diagram illustrating an exemplary electron beam inspection (EBI) system, consistent with embodiments of the present disclosure.

FIG. 1 illustrates an exemplary electron beam inspection (EBI) system 100 consistent with embodiments of the present disclosure. As shown in FIG. 1, EBI system 100 includes a main chamber 101, a load/lock chamber 102, an electron beam tool 104, and an equipment front end module (EFEM) 106. Electron beam tool 104 is located within main chamber 101. EFEM 106 includes a first loading port 106a and a second loading port 106b. EFEM 106 may include additional loading port(s). First loading port 106a and second loading port 106b receive wafer cassettes that contain wafers (e.g., semiconductor wafers or wafers made of other material(s)) or samples to be inspected (wafers and samples are collectively referred to as "wafers" hereafter).

One or more robot arms (not shown) in EFEM 106 transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robot arms (not shown) transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by electron beam tool 104.

Figure 2:
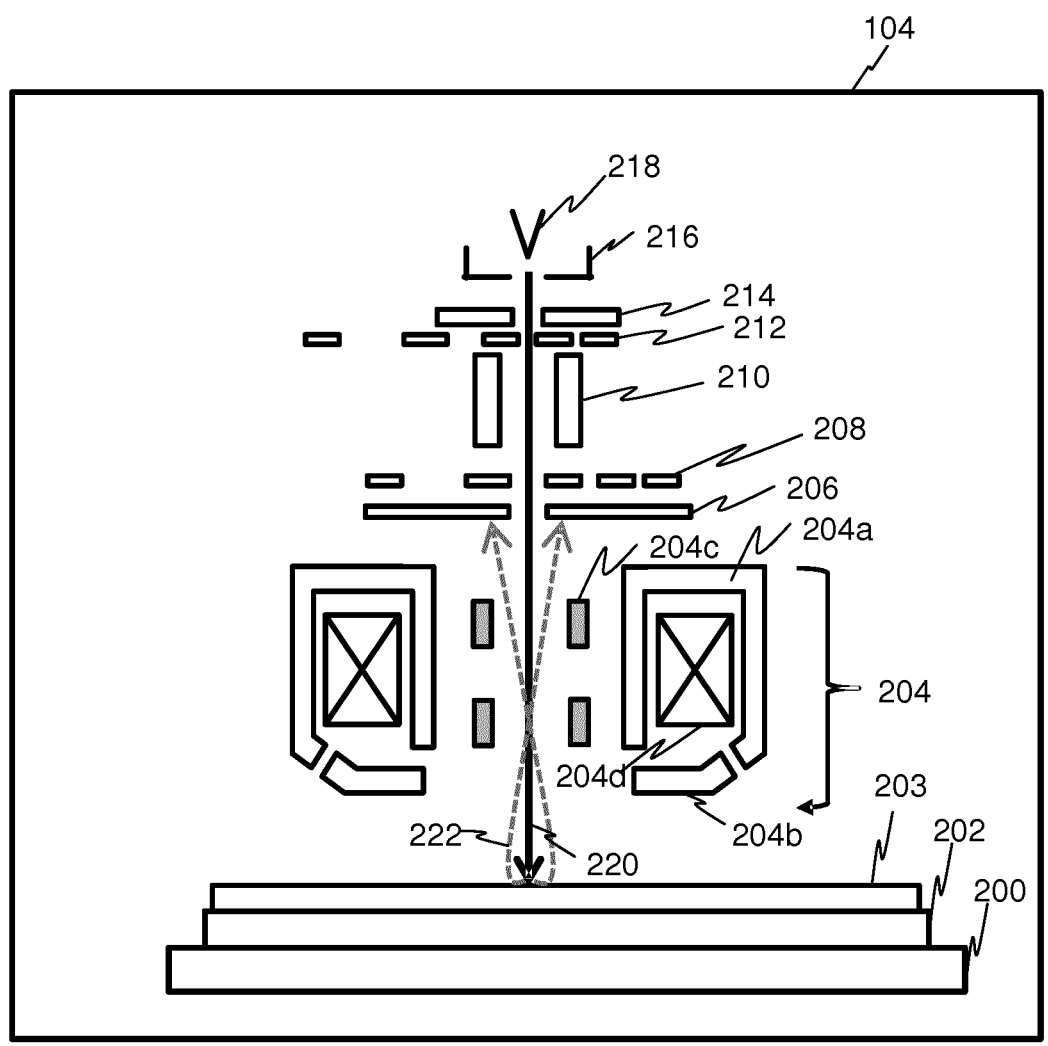
FIG. 2 is a schematic diagram illustrating an exemplary electron beam tool that can be a part of the exemplary electron beam inspection of FIG. 1, consistent with embodiments of the present disclosure.

FIG. 2 illustrates exemplary components of electron beam tool 104, consistent with embodiments of the present disclosure. As shown in FIG. 2, electron beam tool 104 includes a motorized stage 200, and a wafer holder 202 supported by motorized stage 200 to hold a wafer 203 to be inspected. Electron beam tool 104 further includes an objective lens assembly 204, electron detector 206 (which includes electron sensor surfaces 206a and 206b), an objective aperture 208, a condenser lens 210, a beam limit aperture 212, a gun aperture 214, an anode 216, and a cathode 218. Objective lens assembly 204, in one embodiment, can include a modified swing objective retarding immersion lens (SORIL), which includes a pole piece 204a, a control electrode 204b, a deflector 204c, and an exciting coil 204d. Electron beam tool 104 may additionally include an energy dispersive X-ray spectrometer (EDS) detector (not shown) to characterize the materials on the wafer.

A primary electron beam 220 is emitted from cathode 218 by applying a voltage between anode 216 and cathode 218. Primary electron beam 220 passes through gun aperture 214 and beam limit aperture 212, both of which can determine the size of electron beam entering condenser lens 210, which resides below beam limit aperture 212. Condenser lens 210 focuses primary electron beam 220 before the beam enters objective aperture 208 to set the size of the electron beam before entering objective lens assembly 204. Deflector 204c deflects primary electron beam 220 to facilitate beam scanning on the wafer. For example, in a scanning process, deflector 204c can be controlled to deflect primary electron beam 220 sequentially onto different locations of top surface of wafer 203 at different time points, to provide data for image reconstruction for different parts of wafer 203. Moreover, deflector 204c can also be controlled to deflect primary electron beam 220 onto different sides of wafer 203 at a particular location, at different time points, to provide data for stereo image reconstruction of the wafer structure at that location. Further, in some embodiments, anode 216 and cathode 218 can be configured to generate multiple primary electron beams 220, and electron beam tool 104 can include a plurality of deflectors 204c to project the multiple primary electron beams 220 to different parts/sides of the wafer at the same time, to provide data for image reconstruction for different parts of wafer 203.

Exciting coil 204d and pole piece 204a generate a magnetic field that begins at one end of pole piece 204a and terminates at the other end of pole piece 204a. A part of wafer 203 being scanned by primary electron beam 220 can be immersed in the magnetic field and can be electrically charged, which, in turn, creates an electric field. The electric field reduces the energy of impinging primary electron beam 220 near the surface of the wafer before it collides with the wafer. Control electrode 204b, being electrically isolated from pole piece 204a, controls an electric field on the wafer to prevent micro-arching of the wafer and to ensure proper beam focus.

A secondary electron beam 222 can be emitted from the part of wafer 203 upon receiving primary electron beam 220. Secondary electron beam 222 can form a beam spot (e.g., one of beam spots 240a and 240b) on sensor surfaces 206a and 206b of electron detector 206. Electron detector 206 can generate a signal (e.g., a voltage, a current, etc.) that represents an intensity of the beam spot, and provide the signal to a processing system (not shown in FIG. 2). The intensity of secondary electron beam 222, and the resultant beam spot, can vary according to the external and/or internal structure of wafer 203. Moreover, as discussed above, primary electron beam 220 can be projected onto different locations of the top surface of the wafer, and/or different sides of the wafer at a particular location, to generate secondary electron beams 222 (and the resultant beam spot) of different intensities. Therefore, by mapping the intensities of the beam spots with the locations of wafer 203, the processing system can reconstruct an image that reflects the internal and/or external structures of wafer 203.

Although FIG. 2 shows electron beam tool 104 as a single-beam inspection tool that uses only one primary electron beam to scan one location of wafer 203 at a time, it is contemplated that electron beam tool 104 may also be a multi-beam inspection tool that employs multiple primary electron beamlets to simultaneously scan multiple locations on wafer 203. The present application does not limit the number of electron beams used in electron beam tool 104.

Figure 3:
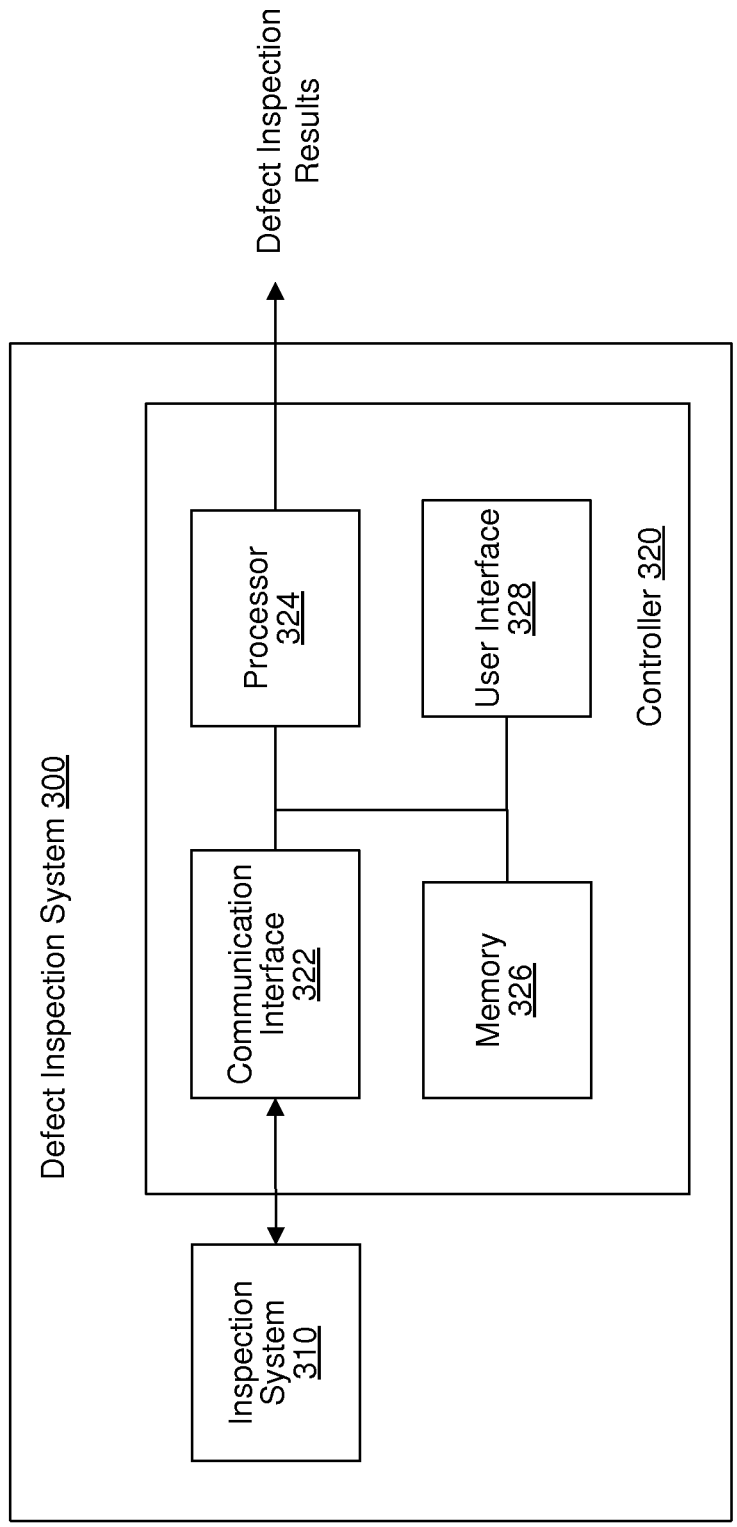
FIG. 3 is a block diagram of an exemplary defect inspection system, consistent with embodiments of the present disclosure.

FIG. 3 is a block diagram of an exemplary defect inspection system 300, consistent with embodiments of the present disclosure. Referring to FIG. 3, defect inspection system 300 includes a wafer inspection system 310 and a controller 320. Wafer inspection system 310 can be electron beam inspection (EBI) system 100 described in connection with FIG. 1. It is appreciated that controller 320 can be part of and/or remote from EBI system 100.

Wafer inspection system 310 can be any inspection system that can generate inspection data representing an image of a wafer. The wafer can be a semiconductor wafer substrate, or a semiconductor wafer substrate having one or more epi-layers and/or process films. Wafer inspection system 310 can be any currently available or developing wafer inspection system. The embodiments of the present disclosure do not limit the specific type for wafer inspection system 310 as long as it can generate a wafer image having a resolution high enough to observe key features on the wafer (e.g., less than 20 nm).

Controller 320 has a communication interface 322 that is electrically coupled to the wafer inspection system 310 to receive the inspection data. Controller 320 also includes a processor 324 that is configured to construct an image of the wafer based on the inspection data, analyze the wafer image, and detect wafer defects that appear on the wafer image.

Processor 324 may include one or more of a central processing unit (CPU), an image processing unit, an application-specific integrated circuit (ASIC), a field-programmable gate array (FPGA), etc. In some embodiments, processor 324 may be one or more known or custom processing devices designed to perform functions of the disclosed defect inspection methods, such as a single core or multiple core processors capable of executing parallel processes simultaneously. For example, processor 324 may be a single core processor configured with virtual processing technologies. In certain embodiments, processor 324 may use logical processors to simultaneously execute and control multiple processes. Processor 324 may implement virtual machine technologies, or other known technologies to provide the ability to execute, control, run, manipulate, store, etc. multiple software processes, applications, programs, etc. In some embodiments, processor 324 may include a multiple-core processor arrangement (e.g., dual core, quad core, etc.) configured to provide parallel processing functionalities to execute multiple processes simultaneously. It is appreciated that other types of processor arrangements could be implemented that provide for the capabilities disclosed herein.

Controller 320 may also include memory 326 that includes instructions to enable processor 324 to execute one or more applications, such as the disclosed defect inspection processes, and any other type of application or software known to be available on computer systems. Alternatively or additionally, the instructions, application programs, etc. may be stored in an internal database or an external storage (not shown) in direct communication with controller 320. The internal database and/or external storage may be a volatile or non-volatile, magnetic, semiconductor, tape, optical, removable, non-removable, or other type of storage device or tangible and/or non-transitory computer-readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Consistent with the disclosed embodiments, memory 326 may include instructions that, when executed by processor 324, perform one or more processes consistent with the functionalities disclosed herein. Moreover, processor 324 may execute one or more programs located remotely from controller 320. For example, controller 320 may access one or more remote programs, that, when executed, perform functions related to disclosed embodiments.

Consistent with the disclosed embodiments, memory 326 may include instructions implemented as a plurality of modules, which can be hardware modules, software modules, and/or a combination of both. Each of the plurality of modules may be called by processor 324 to detect defects having a different property. For example, the plurality of modules may include a first module configured to detect bridges between lines, a second module configured to detect broken lines, a third module configured to detect certain type of critical-dimension (CD) errors, etc. To detect defects of a specified property, processor 324 may call the corresponding module and input the inspection data to the module, such that the module may output POIs that include defects of the specified property.

Controller 320 may also include a user interface 328. User interface 328 may include a display, such as a cathode ray tube (CRT), a liquid crystal display (LCD), or a touch screen, for displaying information to a computer user. For example, the display may be used to present the defect inspection result to a user. Interface 328 may also include an input device, including alphanumeric and other keys, for communicating information and command selections to processor 324. Another type of user input device is a cursor control, such as a mouse, a trackball, or cursor direction keys for communicating direction information and command selections to processor 328 and for controlling cursor movement on the display. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor. For example, a user may use the input device to select an inspection area of a wafer and/or enter the defect properties to be examined.

In some embodiments, user interface 328 may be configured to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

Figure 4:
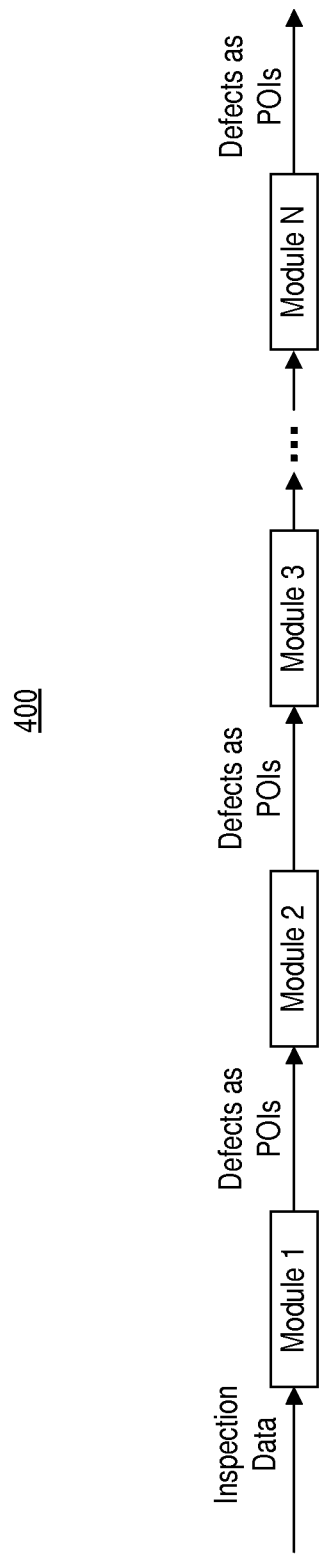
FIG. 4 is a flowchart illustrating a process for cascade defect inspection, consistent with embodiments of the present disclosure.

FIG. 4 is a flowchart illustrating a process 400 for cascade defect inspection, consistent with embodiments of the present disclosure. Referring to FIG. 4, process 400 may be performed by a controller, such as controller 320 described in connection with FIG. 3. When it is desired to detect defects with multiple properties, the controller may call multiple modules, each of which is configured to detect defects with a different property. The controller may call the multiple modules in a serial manner, and use the defect output of a preceding module as the input for a subsequent module. This way, the surface area of a wafer can be inspected in a cascading style to detect multiple defect properties.

Specifically, as shown in FIG. 4, the controller may first call Module 1 and input inspection data received from a wafer inspection system, e.g., inspection system 310 (FIG. 3), to Module 1. As such, Module 1 outputs a first set of POIs, each of which is a sub-region of the wafer that includes the defects having a first property. The controller then calls Module 2 and inputs the first set of POIs to Module 2, such that Module 2 outputs a second set of POIs that includes defects having a second property. Because Module 2 inspects only the areas in which Module 1 reports defects, i.e., the first set of POIs, the controller avoids from applying Module 2 to the entire inspection area of the wafer. Thus, the inspection throughput can be improved.

The controller may similarly call Module 3 and input the second set of POIs to Module 3, such that the calling of Module 3 outputs a third set of POIs that includes defects with a third property. The controller may proceed in a similar manner to Module N, wherein N is an integer equal to or larger than 2. In this way, a subsequent module inspects only the POIs in which the preceding module reports defects. Finally, Module N outputs a Nth set of POIs that includes defects with the N properties corresponding to Modules 1, 2, . . . , N, respectively.

Figure 5A:
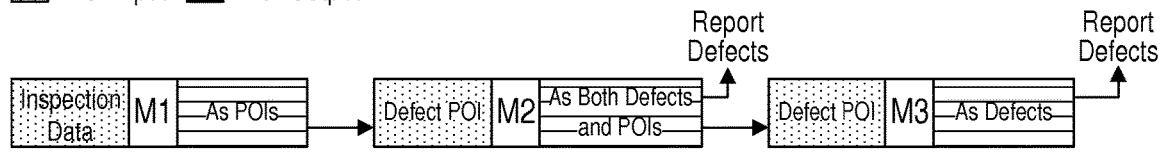
FIG. 5A is a flowchart illustrating an exemplary cascade defect inspection, consistent with embodiments of the present disclosure.

Next, various embodiments of the disclosed cascade defect inspection method will be described. FIG. 5A is a flowchart illustrating an exemplary cascade defect inspection. Referring to FIG. 5A, a controller may input inspection data of a wafer, e.g., inspection data received from an inspection tool or outputted by a preceding module, to Module M1. The controller calls Module M1 to output a first set of POIs that includes defects having a first property, which is then used as input for Module M2. Subsequently, Module M2 outputs a second set of POIs that includes defects having a second property. The controller may report the second set of POIs as defects having both the first and second properties. The controller may additionally use the second set of POIs as input for Module M3, which then outputs a third set of POIs that includes defects having a third property. The controller may report the third set of POIs as defects having the third property. In some embodiments, the controller may report the defects to a user via a user interface, such as the display in user interface 328.

Figure 5B:
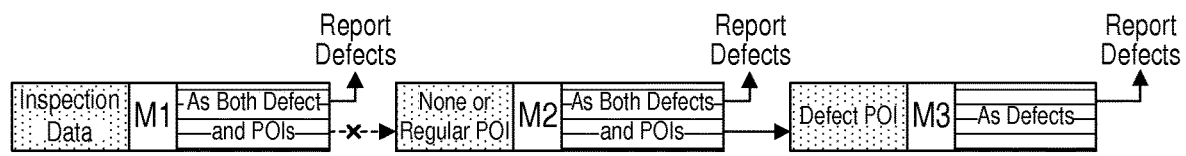
FIG. 5B is a flowchart illustrating another exemplary cascade defect inspection, consistent with embodiments of the present disclosure.

FIG. 5B is a flowchart illustrating another exemplary cascade defect inspection. Unlike FIG. 5A, in the embodiment shown in FIG. 5B, the first set of POIs outputted by Module M1 is not used as input for Module M2 or M3, but rather reported by the controller as defects having the first property. Moreover, the controller inputs inspection data other than the data outputted by Module M1 to Module M2, which outputs the second set of POIs that includes defects having the second property. The second set of POIs is reported as defects having both the second property, and further used as input for Module M3. Finally, Module M3 outputs the third set of POIs that includes defects having the third property, which is reported by the controller as defects having both the second and third properties.

Figure 5C:
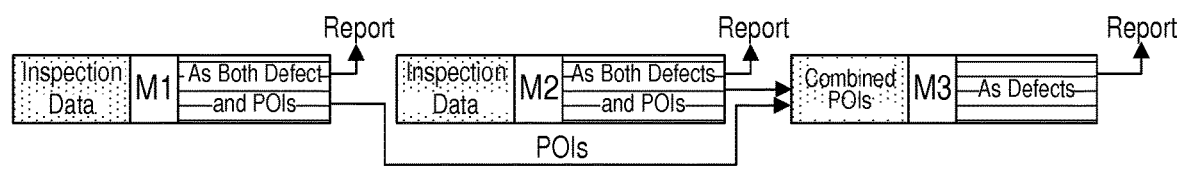
FIG. 5C is a flowchart illustrating another exemplary cascade defect inspection, consistent with embodiments of the present disclosure.

FIG. 5C is a flowchart illustrating another exemplary cascade defect inspection. Referring to FIG. 5C, inspection data of the wafer is input to Modules M1 and M2 separately. The output of Module M is not used as input for Module M2. Rather, the outputs of Modules M1 and M2 are combined and used as input for Module M3. The output of Module M1 is reported as defects having the first property. The output of Module M2 is reported as defects having the second property. And the output of Module M3 is reported as defects having i) both the first and third properties, and/or ii) both the second and third properties.

Figure 5D:
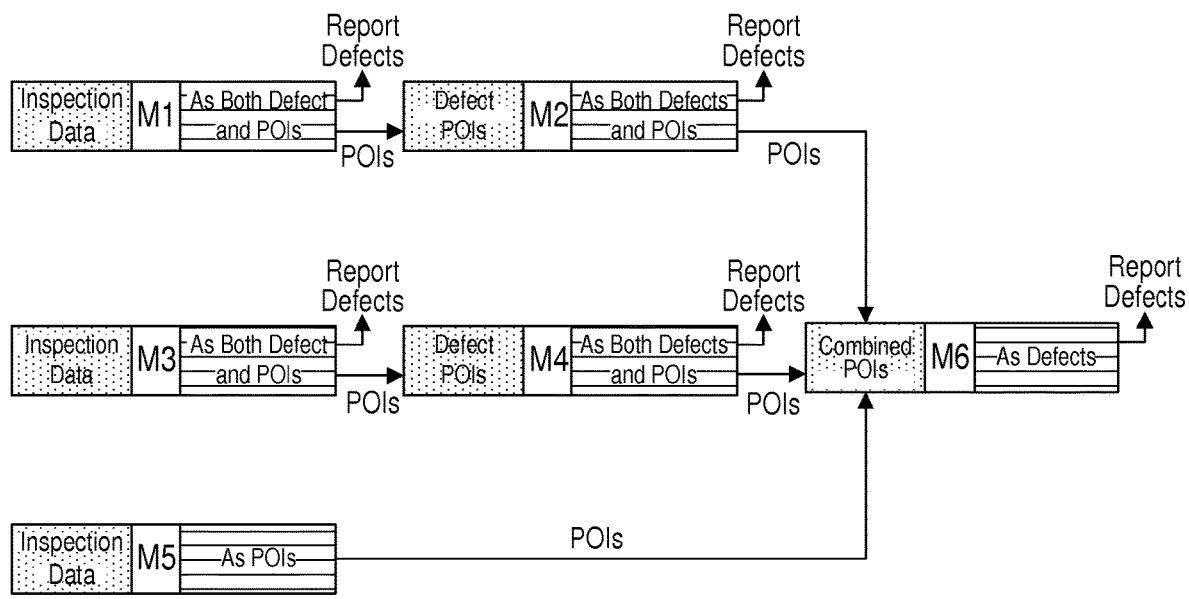
FIG. 5D is a flowchart illustrating another exemplary cascade defect inspection, consistent with embodiments of the present disclosure.

FIG. 5D is a flowchart illustrating another exemplary cascade defect inspection. Referring to FIG. 5D, the output of Module M1 is reported as defects having the first property and used as input for Module M2. The output of Module M2 is reported as defects having both the first and second properties, and used as input for Module M6. Similarly, the output of Module M3 is reported as defects having the third property and used as input for Module M4. The output of Module M4 is reported as defects having both the third and fourth properties, and used as input for Module M6. Moreover, Module M5 is called to output POIs that include defects having the fifth property. The outputs of Modules M2, M4, and M5 are then combined as input for Module M6, which has an output reported as defects having i) the first, second, and sixth properties, ii) the third, fourth, and sixth properties, and/or iii) the fifth and sixth properties.

Figure 6A:
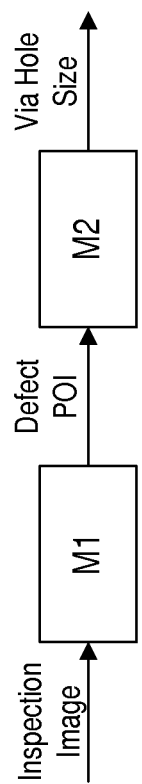
FIG. 6A is a flowchart illustrating a process for cascade defect inspection, consistent with embodiments of the present disclosure.
Figure 6B:
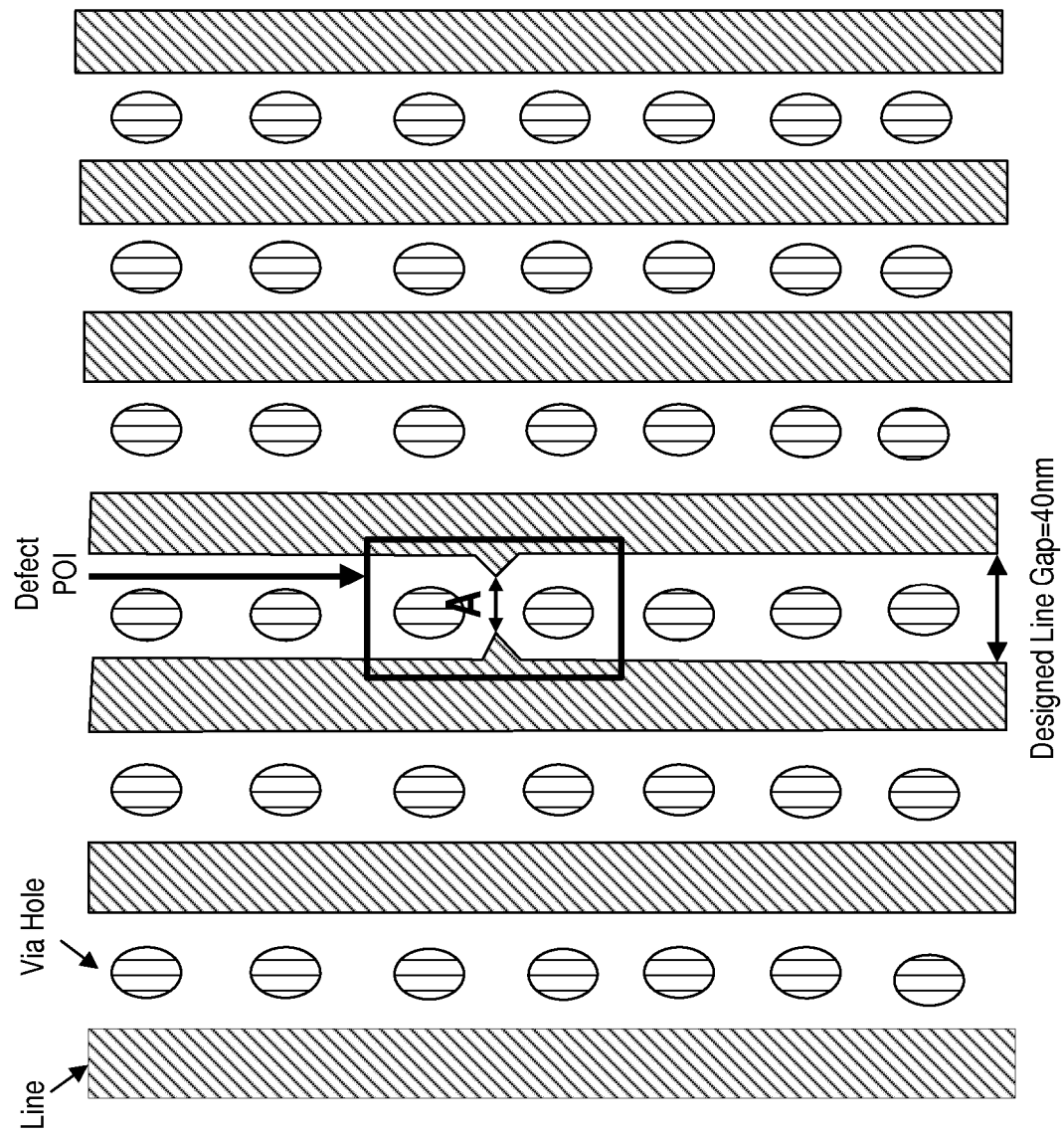
FIG. 6B is a schematic diagram illustrating the process shown in FIG. 6A, consistent with embodiments of the present disclosure.

Next, to further illustrate the application of the disclosed cascade defect inspection methods, two examples are described. In the first example, FIG. 6A is a schematic diagram illustrating an exemplary process for cascade defect inspection, and FIG. 6B is a schematic diagram illustrating the process shown in FIG. 6A. For example, users may be interested in the sizes of via holes only within a small area in which the line gap is less than 30 nm. As such, referring to FIG. 6A, the controller may first call a Module M1 configured to measure line gaps, and input the inspection image of the wafer to Module M1. Module M1 outputs a set of POIs that includes line gaps less than 30 nm. For example, FIG. 6B shows a part of a pattern printed on the wafer. The pattern includes multiple via holes and conductor lines. The designed line gap is 40 nm. Module M1 outputs a POI centered at Point A, where the line gap is less than 30 nm.

Referring to FIG. 6A, the controller subsequently calls a Module M2 configured to measure via hole sizes, and inputs the output of Module M1 to Module M2. For example, referring to FIG. 6B, the controller calls Module M2 to inspect only those via holes in the POI(s) outputted by Module M1. In this way, the controller avoids from applying Module M2 to the entire inspection image, and thus the inspection throughput can be improved.

Figure 7A:
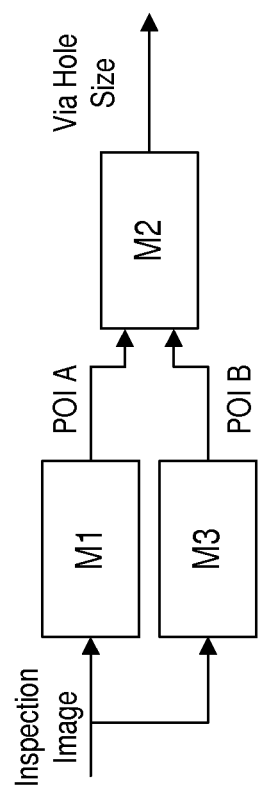
FIG. 7A is a flowchart illustrating a process for cascade defect inspection, consistent with embodiments of the present disclosure.
Figure 7B:
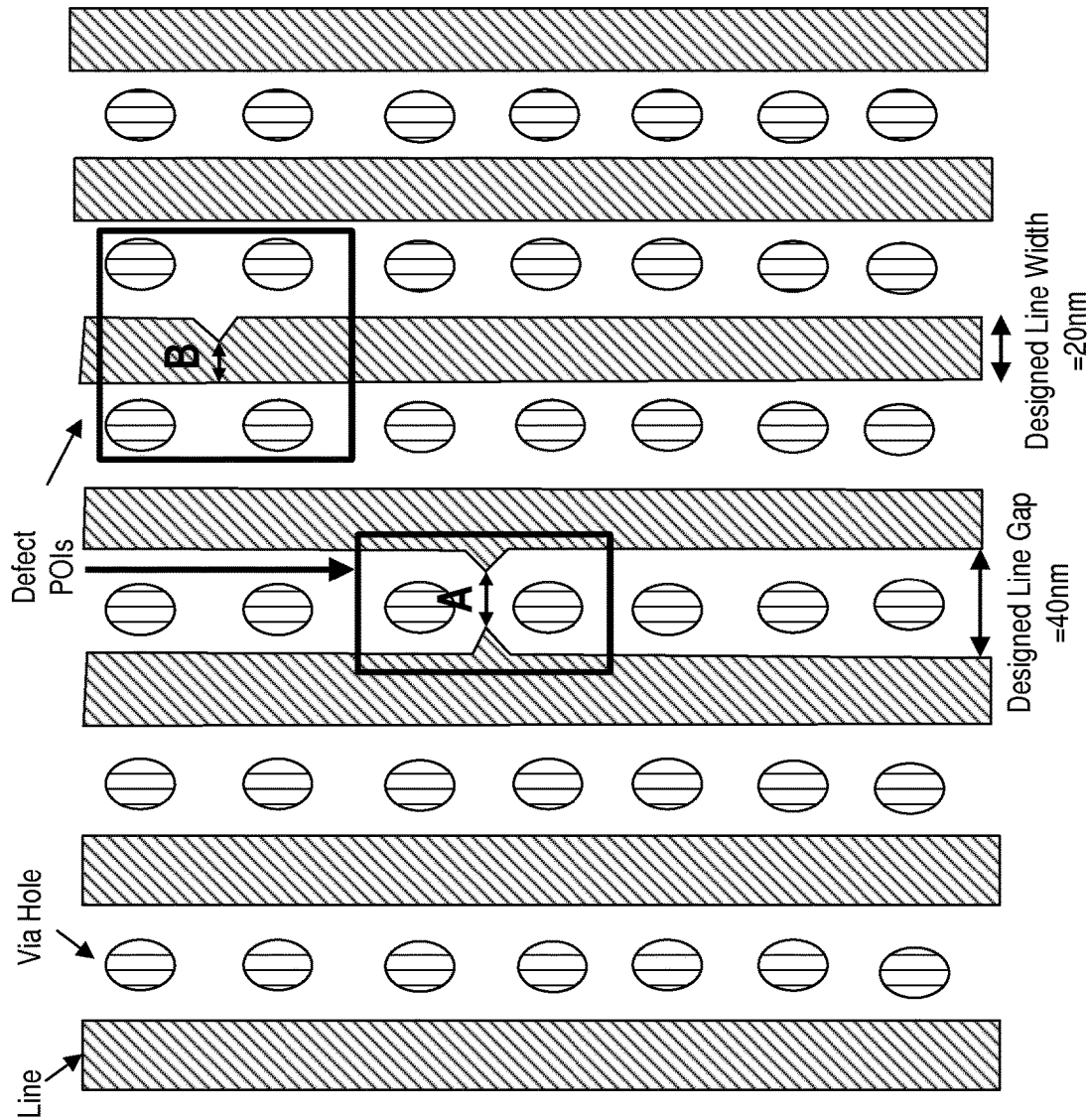
FIG. 7B is a schematic diagram illustrating the process shown in FIG. 7A, consistent with embodiments of the present disclosure.

In the second example, FIG. 7A is a schematic diagram illustrating an exemplary process for cascade defect inspection, and FIG. 7B is a schematic diagram illustrating the process shown in FIG. 7A. For example, users may be interested in the sizes of via holes only within a small area in which i) the line gap is less than 30 nm or ii) the line width is less than 10 nm. As such, referring to FIG. 7A, the controller calls Module M1, which is configured to measure line gaps, and input the inspection image of the wafer to Module M1. Module M1 outputs a set of POIs that includes line gaps less than 30 nm. The controller also calls a Module M3 configured to measure line widths, and input the inspection image of the wafer to Module M3. Module M3 outputs a set of POIs that includes line widths less than 10 nm. For example, FIG. 7B shows a part of a pattern printed on the wafer. The pattern includes multiple via holes and conductor lines. The designed line gap is 40 nm. Module M1 outputs a POI centered at Point A, where the line gap is less than 30 nm. Moreover, the designed line width is 20 nm. Module M3 outputs a POI centered at Point B, where the line width is less than 10 nm.

Referring to FIG. 7A, the controller subsequently combines the outputs of Modules M1 and M3, ad use them as the input for Module M2, which is configured to measure via hole sizes. For example, referring to FIG. 7B, Module M2 is called to inspect only those via holes in the POIs outputted by Modules M1 and M3. In this way, the controller avoids from applying Module M2 to the entire inspection image.

According to the above disclosed embodiments, defects of a first property are used as POIs for detecting defects of a second property. Compared to a typical defect inspection method that inspects defects of different properties separately, the disclosed cascade defect inspection method can show the correlations of different defect properties. Moreover, because the disclosed method does not need to repeatedly inspect the entire wafer image, the throughput is improved. Moreover, a defect that is recognized by multiple modules is less likely to be a false positive. Therefore, the nuisance rate is lowered.

The embodiments may further be described using the following clauses:

1. A computer system comprising:
   a memory storing instructions implemented as a plurality of modules, each of the plurality of modules being configured to detect defects having a different property; and
   a controller configured to cause the computer system to:
   receive inspection data representing an image of a wafer,
   input the inspection data to a first module of the plurality of modules, the first module outputs a first set of points of interests (POIs) having a first property;
   input the first set of POIs to a second module of the plurality of modules, the second module outputs a second set of POIs having a second property; and
   report the second set of POIs as defects having both the first property and the second property.

2. The computer system of clause 1, wherein the controller is further configured to cause the computer system to:
   report the first set of POIs as defects having the first property.

3. The computer system of any one of clauses 1 and 2, wherein the controller is further configured to cause the computer system to:
   input the inspection data to a third module of the plurality of modules, the third module outputs a third set of POIs having a third property;
   input the first and third sets of POIs to the second module, the second module outputs a fourth set of POIs having the second property; and
   report the fourth set of POIs as defects having i) the first property or the third property, and ii) the second property.

4. The computer system of any one of clauses 1-3, wherein the controller is further configured to cause the computer system to:
   input the second set of POIs to a fourth module of the plurality of modules, the fourth module outputs a fifth set of POIs having a fourth property; and
   report the fifth set of POIs as defects having the first, second, and fourth properties.

5. The computer system of any one of clauses 1-4, wherein POIs outputted by each of the plurality of modules are sub-regions of the wafer that include possible defects.

6. The computer system of any one of clauses 1-5, wherein the property of a defect includes at least one of a defect size and a defect type.

7. The computer system of any one of clauses 1-6, wherein the computer system is coupled with an electron-beam inspection tool configured to scan the wafer with one or more primary electron beams and to generate the inspection data based on one or more sets of secondary electrons reflected from the wafer, wherein the controller is configured to cause the computer system to receive the inspection data from the electron-beam inspection tool and generate the inspection image based on the inspection data.

8. A computer system comprising:
a memory storing instructions; and
a processor electronically coupled to the memory and configured to execute the instructions to cause the computer system to:
receive inspection data representing an image of a wafer;
determine, in the inspection image, a first set of points of interests (POIs) having a first property;
determine, in the first set of POIs, a second set of POIs having a second property; and
report the second set of POIs as defects having both the first property and the second property.

9. The computer system of clause 8, wherein the processor is further configured to execute the instructions to cause the computer system to:
report the first set of POIs as defects having the first property.

10. The computer system of any one of clauses 8 and 9, wherein the processor is further configured to execute the instructions to cause the computer system to:
determine, in the inspection image, a third set of POIs having a third property;
determine, in the first and third set of POIs, a fourth set of POIs having the second property; and report the fourth set of POIs as defects having i) the first property or the third property, and ii) the second property.

11. The computer system of any one of clauses 8-10, wherein the processor is further configured to execute the instructions to cause the computer system to:
determine, in the second set of POIs, a fifth set of POIs having a fourth property; and report the fifth set of POIs as defects having the first, second, and fourth properties.

12. The computer system of any one of clauses 8-11, wherein the POIs determined by the processor are sub-regions of the wafer that include possible defects.

13. The computer system of any one of clauses 8-12, wherein the property of a defect includes at least one of a defect size and a defect type.

14. The computer system of any one of clauses 8-13, wherein the computer system is coupled with an electron-beam inspection tool configured to scan the wafer with one or more primary electron beams and to generate the inspection data based on one or more sets of secondary electrons reflected from the wafer, wherein the processor is configured to cause the computer system to receive the inspection data from the electron-beam inspection tool and generate the inspection image based on the inspection data.

15. A defect inspection system comprising:
an inspection tool for inspecting a wafer;
a memory storing instructions implemented as a plurality of modules, each of the plurality of modules being configured to detect defects with a different property; and
a controller electronically coupled to the inspection tool and memory, the controller being configured to cause the defect inspect system to:
receive, from the inspection tool, inspection data representing an image of the wafer;
input the inspection data to a first module of the plurality of modules, the first module outputs a first set of points of interests (POIs) having the first property;
input the first set of POIs to a second module of the plurality of modules, the second module outputs a second set of POIs having the second property; and
report the second set of POIs as defects having both the first property and the second property.

16. The defect inspection system of clause 15, wherein the controller is further configured to cause the defect inspect system to:
report the first set of POIs as defects having the first property.

17. The defect inspection system of any one of clauses 15 and 16, wherein the controller is further configured to cause the defect inspect system to:
input the inspection data to a third module of the plurality of modules, the third module outputs a third set of POIs having a third property;
input the first and third sets of POIs to the second module, the second module outputs a fourth set of POIs having the second property; and
report the fourth set of POIs as defects having i) the first property or the third property, and ii) the second property.

18. The defect inspection system of any one of clauses 15-17, wherein the controller is further configured to cause the defect inspect system to:
input the second set of POIs to a fourth module of the plurality of modules, the fourth module outputs a fifth set of POIs having a fourth property; and
report the fifth set of POIs as defects having the first, second, and fourth properties.

19. The defect inspection system of any one of clauses 15-18, wherein POIs outputted by each of the plurality of modules are sub-regions of the wafer that include possible defects.

20. The defect inspection system of any one of clauses 15-19, wherein the property of a defect includes at least one of a defect size and a defect type.

21. The defect inspection system of any one of clauses 15-20, wherein:
the inspection tool is configured to scan the wafer with one or more primary electron beams and to generate the inspection data based on one or more sets of secondary electrons reflected from the wafer, and
the controller is configured to cause the defect inspect system to generate the inspection image based on the inspection data.

22. A defect inspection system comprising:
an inspection tool for inspecting a wafer;
a memory storing instructions; and
a processor electronically coupled to the memory and the inspection tool, the processor being configured to execute the instructions to cause the defect inspect system to:

receive, from the inspection tool, inspection data representing an image of the wafer;
determine, in the inspection image, a first set of points of interests (POIs) having a first property;
determine, in the first set of POIs, a second set of POIs having a second property; and
report the second set of POIs as defects having both the first property and the second property.

23. The defect inspection system of clause 22, wherein the processor is further configured to execute the instructions to cause the defect inspect system to:
report the first set of POIs as defects having the first property.

24. The defect inspection system of any one of clauses 22 and 23, wherein the processor is further configured to execute the instructions to cause the defect inspect system to:
determine, in the inspection image, a third set of POIs having a third property;
determine, in the first and third set of POIs, a fourth set of POIs having the second property; and report the fourth set of POIs as defects having i) the first property or the third property, and ii) the second property.

25. The defect inspection system of any one of clauses 22-24, wherein the processor is further configured to execute the instructions to cause the defect inspect system to:
determine, in the second set of POIs, a fifth set of POIs having a fourth property; and report the fifth set of POIs as defects having the first, second, and fourth properties.

26. The defect inspection system of any one of clauses 22-25, wherein the POIs determined by the processor are sub-regions of the wafer that include possible defects.

27. The defect inspection system of any one of clauses 22-26, wherein the property of a defect includes at least one of a defect size and a defect type.

28. The defect inspection system of any one of clauses 22-27, wherein:
the inspection tool is configured to scan the wafer with one or more primary electron beams and to generate the inspection data based on one or more sets of secondary electrons reflected from the wafer, and
the controller is configured to cause the defect inspect system to generate the inspection image based on the inspection data.

29. A method comprising:
receiving inspection data representing an image of a wafer;
inputting the inspection data to a first module of a plurality of modules, each of the plurality of modules being configured to detect defects with a different property, the first module outputting a first set of points of interests (POIs) having a first property;
inputting the first set of POIs to a second module of the plurality of modules, the second module outputting a second set of POIs having a second property; and
reporting the second set of POIs as defects having both the first property and the second property.

30. The method of clause 29, further comprising:
reporting the first set of POIs as defects having the first property.

31. The method of any one of clauses 29 and 30, wherein the method further comprises:
inputting the inspection data to a third module of the plurality of modules, the third module outputting a third set of POIs having a third property;
inputting the first and third sets of POIs to the second module, the second module outputting a fourth set of POIs having the second property; and
reporting the fourth set of POIs as defects having i) the first property or the third property, and ii) the second property.

32. The method of any one of clauses 29-31, wherein the method further comprises:
inputting the second set of POIs to a fourth module of the plurality of modules, the fourth module outputting a fifth set of POIs having a fourth property; and
reporting the fifth set of POIs as defects having the first, second, and fourth properties.

33. The method of any one of clauses 29-32, wherein POIs outputted by each of the plurality of modules are sub-regions of the wafer that include possible defects.

34. The method of any one of clauses 29-33, wherein the property of a defect includes at least one of a defect size and a defect type.

35. The method of any one of clauses 29-34, further comprising:
receiving the inspection data from an electron-beam inspection tool that scans the wafer with one or more primary electron beams and generates the inspection data based on one or more sets of secondary electrons reflected from the wafer; and generating the inspection image based on the inspection data.

36. A method comprising:
receiving inspection data representing an image of a wafer,
determining, in the inspection image, a first set of points of interests (POIs) having a first property;
determining, in the first set of POIs, a second set of POIs having a second property; and reporting the second set of POIs as defects having both the first property and the second property.

37. The method of clause 36, further comprising:
reporting the first set of POIs as defects having the first property.

38. The method of any one of clauses 36 and 37, wherein the method further comprises:
determining, in the inspection image, a third set of POIs having a third property;
determining, in the first and third set of POIs, a fourth set of POIs having the second property; and
reporting the fourth set of POIs as defects having i) the first property or the third property, and ii) the second property.

39. The method of any one of clauses 36-38, wherein the method further comprises:
determining, in the second set of POIs, a fifth set of POIs having a fourth property; and reporting the fifth set of POIs as defects having the first, second, and fourth properties.

40. The method of any one of clauses 36-39, wherein the POIs are sub-regions of the wafer that include possible defects.

41. The method of any one of clauses 36-40, wherein the property of a defect includes at least one of a defect size and a defect type.

42. The method of any one of clauses 36-41, further comprising:
receiving the inspection data from an electron-beam inspection tool that scans the wafer with one or more primary electron beams and generates the inspection data based on one or more sets of secondary electrons reflected from the wafer; and
generating the inspection image based on the inspection data.

43. A non-transitory computer-readable medium storing a set of instructions that is executable by one or more processors of one or more devices to cause the one or more devices to perform a method comprising:
receiving inspection data representing an image of a wafer;
inputting the inspection data to a first module of a plurality of modules, each of the plurality of modules being configured to detect defects with a different property, the first module outputting a first set of points of interests (POIs) having a first property;
inputting the first set of POIs to a second module of the plurality of modules, the second module outputting a second set of POIs having the second property; and
reporting the second set of POIs as defects having both the first property and the second property.

44. The medium of clause 43, wherein the set of instructions that is executable by the one or more processors of the one or more devices to cause the one or more devices to further perform: reporting the first set of POIs as defects having the first property.

45. The medium of any one of clauses 43 and 44, wherein the set of instructions that is executable by the one or more processors of the one or more devices to cause the one or more devices to further perform:
inputting the inspection data to a third module of the plurality of modules, the third module outputting a third set of POIs having a third property;
inputting the first and third sets of POIs to the second module, the second module outputting a fourth set of POIs having the second property; and
reporting the fourth set of POIs as defects having i) the first property or the third property, and ii) the second property.

46. The medium of any one of clauses 43-45, wherein the set of instructions that is executable by the one or more processors of the one or more devices to cause the one or more devices to further perform:
inputting the second set of POIs to a fourth module of the plurality of modules, the fourth module outputting a fifth set of POIs having a fourth property; and
reporting the fifth set of POIs as defects having the first, second, and fourth properties.

47. The medium of any one of clauses 43-46, wherein POIs outputted by each of the plurality of modules are sub-regions of the wafer that include possible defects.

48. The medium of any one of clauses 43-47, wherein the property of a defect includes at least one of a defect size and a defect type.

49. The medium of any one of clauses 43-48, wherein the set of instructions that is executable by the one or more processors of the one or more devices to cause the one or more devices to further perform:
receiving the inspection data from an electron-beam inspection tool that scans the wafer with one or more primary electron beams and generates the inspection data based on one or more sets of secondary electrons reflected from the wafer; and
generating the inspection image based on the inspection data.

50. A non-transitory computer-readable medium storing a set of instructions that is executable by one or more processors of one or more devices to cause the one or more devices to perform a method comprising:
receiving inspection data representing an image of a wafer, determining, in the inspection image, a first set of points of interests (POIs) having a first property;
determining, in the first set of POIs, a second set of POIs having a second property; and
reporting the second set of POIs as defects having both the first property and the second property.

51. The medium of clause 50, wherein the set of instructions that is executable by the one or more processors of the one or more devices to cause the one or more devices to further perform:
reporting the first set of POIs as defects having the first property.

52. The medium of any one of clauses 50 and 51, wherein the set of instructions that is executable by the one or more processors of the one or more devices to cause the one or more devices to further perform:
determining, in the inspection image, a third set of POIs having a third property;
determining, in the first and third set of POIs, a fourth set of POIs having the second property; and
reporting the fourth set of POIs as defects having i) the first property or the third property, and ii) the second property.

53. The medium of any one of clauses 50-52, wherein the set of instructions that is executable by the one or more processors of the one or more devices to cause the one or more devices to further perform:
determining, in the second set of POIs, a fifth set of POIs having a fourth property; and reporting the fifth set of POIs as defects having the first, second, and fourth properties.

54. The medium of any one of clauses 50-53, wherein the POIs are sub-regions of the wafer that include possible defects.

55. The medium of any one of clauses 50-54, wherein the property of a defect includes at least one of a defect size and a defect type.

56. The medium of any one of clauses 50-55, wherein the set of instructions that is executable by the one or more processors of the one or more devices to cause the one or more devices to further perform:
receiving the inspection data from an electron-beam inspection tool that scans the wafer with one or more primary electron beams and generates the inspection data based on one or more sets of secondary electrons reflected from the wafer; and
generating the inspection image based on the inspection data.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A computer system comprising:
    a memory storing instructions implemented as a plurality of modules, each of the plurality of modules being configured to detect defects having a different property; and
    a controller configured to cause the computer system to:
        receive inspection data representing an image of a wafer;
        input first inspection data to a first module of the plurality of modules, wherein the first module outputs a first set of points of interests (POIs) having a first property;
        input second inspection data to a second module of the plurality of modules, wherein the second inspection data does not include the first set of POIs, and the second module outputs a second set of POIs having a second property;
        input the second set of POIs to a third module of the plurality of modules, wherein the third module outputs a third set of POIs having a third property; and
        report the third set of POIs as defects having both the second property and the third property.

2. The computer system of claim 1, wherein the controller is further configured to cause the computer system to:
    report the first set of POIs as defects having the first property, or
    report the second set of POIs as defects having the second property.

3. The computer system of a claim 1, wherein the controller is further configured to cause the computer system to:
    input the first inspection data to the third module, the third module outputs a fourth set of POIs having the third property;
    input the first and fourth sets of POIs to the second module, the second module outputs a fifth set of POIs having the second property; and
    report the fifth set of POIs as defects having i) the first property or the third property, and ii) the second property.

4. The computer system of claim 1, wherein the controller is further configured to cause the computer system to:
    input the fourth set of POIs to a fourth module of the plurality of modules, the fourth module outputs a sixth set of POIs having a fourth property; and
    report the sixth set of POIs as defects having the first, second, and fourth properties.

5. The computer system of claim 1, wherein POIs outputted by each of the plurality of modules are sub-regions of the wafer that include possible defects.

6. The computer system of claim 1, wherein the property of a defect includes at least one of a defect size and a defect type.

7. The computer system of claim 1, wherein the computer system is coupled with an electron-beam inspection tool configured to scan the wafer with one or more primary electron beams and to generate the inspection data based on one or more sets of secondary electrons reflected from the wafer, wherein the controller is configured to cause the computer system to receive the inspection data from the electron-beam inspection tool and generate the inspection image based on the inspection data.

8. A computer system comprising:
    a memory storing instructions; and
    a processor electronically coupled to the memory and configured to execute the instructions to cause the computer system to:
        receive inspection data representing an image of a wafer;
        determine, in first inspection data representing the image of the wafer, a first set of points of interests (POIs) having a first property;
        determine, in second inspection data representing the image of the wafer, a second set of POIs having a second property, wherein the second inspection data does not include the first set of POIs;
        determine, in the second set of POIs, a third set of POIs having a third property; and
        report the third set of POIs as defects having both the second property and the third property.

9. The computer system of claim 8, wherein the processor is further configured to execute the instructions to cause the computer system to:
    report the first set of POIs as defects having the first property, or
    report the second set of POIs as defects having the second property.

10. The computer system of claim 8, wherein the processor is further configured to execute the instructions to cause the computer system to:
    determine, in the first inspection data, a fourth set of POIs having the third property;
    determine, in the first and fourth sets of POIs, a fifth set of POIs having the second property; and
    report the fifth set of POIs as defects having i) the first property or the third property, and ii) the second property.

11. The computer system of claim 8, wherein the processor is further configured to execute the instructions to cause the computer system to:
    determine, in the fourth set of POIs, a sixth set of POIs having a fourth property; and
    report the sixth set of POIs as defects having the first, second, and fourth properties.

12. The computer system of claim 8, wherein the POIs determined by the processor are sub-regions of the wafer that include possible defects.

13. The computer system of claim 8, wherein the property of a defect includes at least one of a defect size and a defect type.

14. The computer system of claim 8, wherein the computer system is coupled with an electron-beam inspection tool configured to scan the wafer with one or more primary electron beams and to generate the inspection data based on one or more sets of secondary electrons reflected from the wafer, wherein the processor is configured to cause the computer system to receive the inspection data from the electron-beam inspection tool and generate the inspection image based on the inspection data.

15. A method comprising:
    receiving inspection data representing an image of a wafer;
    inputting first inspection data to a first module of a plurality of modules, each of the plurality of modules being configured to detect defects with a different property, wherein the first module outputs a first set of points of interests (POIs) having a first property;
    inputting second inspection data to a second module of the plurality of modules, wherein the second inspection data does not include the first set of POIs, and the second module outputs a second set of POIs having a second property;

inputting the second set of POIs to a third module of the plurality of modules, wherein the third module outputs a third set of POIs having a third property; and reporting the third set of POIs as defects having both the second property and the third property.

\* \* \* \* \*